No. 730,599. PATENTED JUNE 9, 1903.
M. BARTLEY
NUT LOCK.
APPLICATION FILED JAN. 15, 1903.

NO MODEL.

Witnesses:
E. O. MacKenzie.
Chas. S. Ripley.

Inventor:
Milton Bartley
by C. M. Clarke
his attorney.

THE NORRIS PETERS CO., PHOTO-LITHO., WASHINGTON, D. C.

No. 730,599. Patented June 9, 1903.

UNITED STATES PATENT OFFICE.

MILTON BARTLEY, OF PITTSBURG, PENNSYLVANIA.

NUT-LOCK.

SPECIFICATION forming part of Letters Patent No. 730,599, dated June 9, 1903.

Application filed January 15, 1903. Serial No. 139,091. (No model.)

*To all whom it may concern:*

Be it known that I, MILTON BARTLEY, a citizen of the United States, residing at Pittsburg, in the county of Allegheny and State of Pennsylvania, have invented certain new and useful Improvements in Lock-Nuts, of which the following is a specification, reference being had therein to the accompanying drawings.

Figure 1:
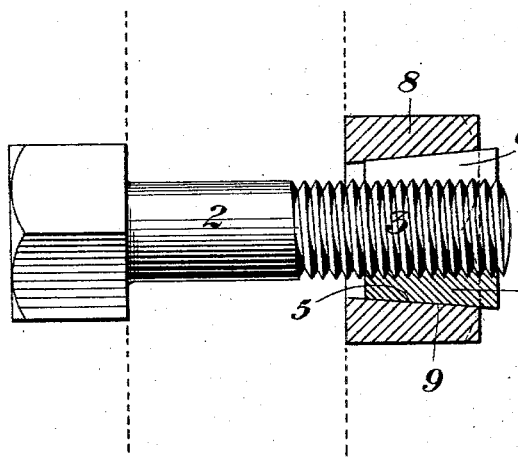
Figure 2:
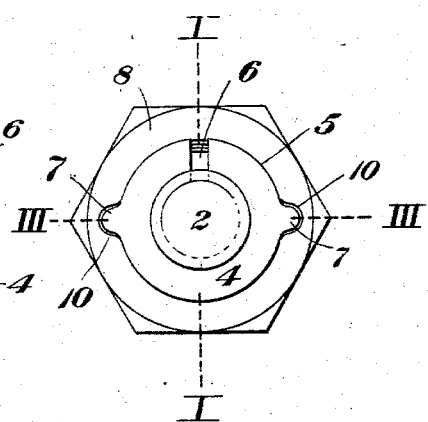
Figure 3:
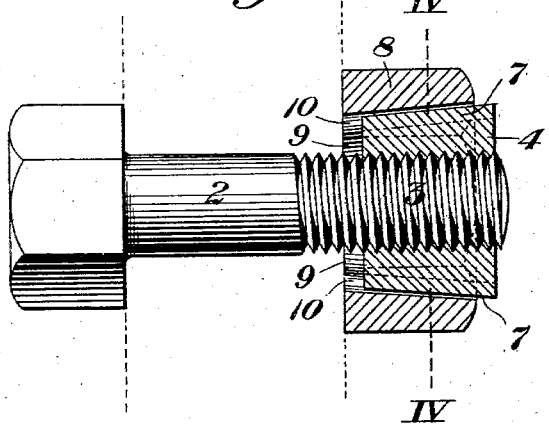
Figure 4:
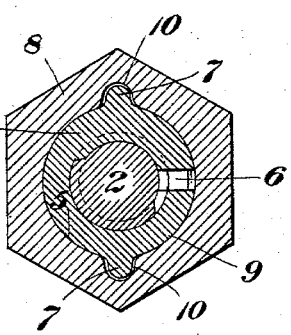
Figure 5:
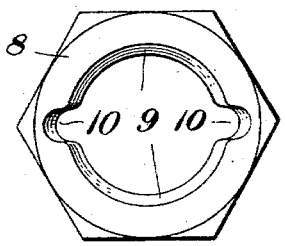
Figure 7:
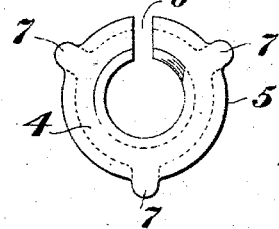
Figure 6:
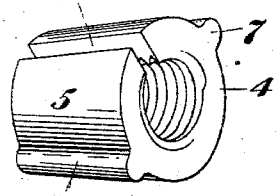

Figure 1 is a longitudinal sectional view of my improved locking mechanism applied to a bolt, the locking-bushing and its turning-nut being in section, indicated by the line I I of Fig. 2. Fig. 2 is an end view thereof. Fig. 3 is a view similar to Fig. 1, but at right angles thereto, as indicated by the line III III of Fig. 2. Fig. 4 is a vertical cross-sectional view on the line IV IV of Fig. 3. Fig. 5 is an outer face view of the nut detached. Fig. 6 is a perspective view of the locking-bushing detached. Fig. 7 is an end view of the bushing, showing a modified arrangement of the turning-lugs.

My invention relates to an improved device for tightening and holding bolts or other similar threaded elements; and it consists of a divided threaded bushing and a surrounding turning-nut adapted to engage the bushing and to rotate it upon the threads of the bolt, the meeting faces of the bushing and nut being inclined or tapered, whereby inward travel of the bushing will cause it to bind against the interior of the nut in the manner of a wedge, whereby the bushing is caused to tightly grip the thread of the bolt.

The invention especially relates to the construction of the nut and bushing, whereby the nut imparts motion to the bushing in a positive efficient manner, so as to equalize the strain and permit of longitudinal travel and also insure efficient gripping action.

Referring to the drawings, 2 is a bolt provided with the usual threaded extremity 3 of uniform pitch.

4 is a bushing having a coniform or exteriorly-tapered bearing-face 5, adapted to be engaged by the similar interiorly-tapered face of the nut and divided throughout its length at one side by a longitudinal slot 6. On each side of the bushing are exterior longitudinal lugs 7 7, also tapered, each of which lugs or abutments is arranged on each side of the bushing, respectively, to one side and the other of the slot 6. If desired, one or more additional lugs may be provided, as shown in Fig. 7; but in such arrangement the lugs adjacent to the slot 6 are arranged on each side of it for the purpose hereinafter explained.

8 is a turning-nut of hexagonal, square, or other suitable form, adapted to be engaged by a wrench or spanner, the interior of the nut being tapered inwardly, as shown at 9, and provided on its inner opposing sides with two or more longitudinal keyways or channels 10, adapted to embrace and engage the lugs 7 of the bushing. These keyways or channels are slightly larger than the lugs 7, so as to make an easy fit thereon and to permit of the expansion or contraction of the bushing under compressing or releasing action when the nut is screwed onto or away from the bolt. A particular advantage in arranging the lugs of the bushing on either side of slot 6 is that equal pressure will be exerted upon the lugs, and the bushing will be free to close in upon the bolt in the action of turning, power being thus applied equally to each of its resilient sides. This is of great advantage and largely contributes to the efficient operation of the device.

While I prefer to taper the lugs 7 and channels 10 at the same degree as the tapering faces 5 and 9, good results may be had by making the lugs and channels parallel, if desired.

I am aware that it is not broadly new to provide nut-locking devices employing a tapered divided bushing and a surrounding interiorly-tapered turning-nut, as shown in patents of Whitmarsh, No. 205,712; Blighton, No. 287,796; Lee, No. 463,521, and Garvin, No. 526,308, and I am also familiar with the construction of patent of Wilson, No. 622,307. The latter patent provides a construction wherein a key or feather D projects into a longitudinal slot B of the bush A; but such construction tends to expand the bush by bearing upon one side only of the bush at the same time that the turning action of the nut tends to compress it, which renders the operation very difficult and requires considerable power. My invention overcomes this difficulty, while giving a much better holding action and symmetrical distribution of the power, preventing unnecessary binding or friction, and insuring efficient operation and holding action at all times. The construction also contributes largely to cheapness and simplicity of manufacture by reason of the ease of making the channels 10 in the nut and of the longitudinal lugs 7 of the bushing.

The device is very simple and compact and when screwed down to the exterior of the bushing is only slightly above the outer surface of the nut, clearance being provided at its inner end for further tightening, while the equal forwardly-turning operation of the channels and the lugs insures free action of the bushing, resulting in a very tight gripping action upon the bolt and insuring against loosening or displacement under jarring shocks or various other strains.

Having described my invention, what I claim is—

1. A nut-lock device consisting of an interiorly-threaded bushing, having a full-length dividing-slot, a tapered exterior, and longitudinal rounded lugs disposed at each side of the slot; and a surrounding nut having a correspondingly-tapered interior, adapted to bind upon the tapered portion of the bushing, and longitudinal rounded channels adapted to freely engage the lugs and exert turning pressure upon them equally in a direction toward and from the slot respectively, substantially as set forth.

2. A nut-lock device consisting of an interiorly-threaded bushing, having a full-length dividing-slot, a tapered exterior, and longitudinal tapered rounded lugs disposed at each side of the slot; and a surrounding nut having a correspondingly-tapered interior, adapted to bind upon the tapered portion of the bushing and longitudinal tapered rounded channels adapted to freely engage the lugs and exert turning pressure upon them equally, in a direction toward and from the slot respectively, substantially as set forth.

In testimony whereof I affix my signature in presence of two witnesses.

MILTON BARTLEY.

Witnesses:
C. M. CLARKE,
J. F. McKENNA.